(12) United States Patent
Leone et al.

(10) Patent No.: US 10,128,784 B2
(45) Date of Patent: Nov. 13, 2018

(54) ALTERNATOR CHARGING BASED ON MARGINAL FUEL COST

(71) Applicant: Ford Global Technologies, LLC, Dearborn, MI (US)

(72) Inventors: Thomas G. Leone, Ypsilanti, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 15/140,207

(22) Filed: Apr. 27, 2016

(65) Prior Publication Data
US 2017/0317626 A1    Nov. 2, 2017

(51) Int. Cl.
| | |
|---|---|
| *F02D 29/02* | (2006.01) |
| *H02P 9/00* | (2006.01) |
| *B60R 16/033* | (2006.01) |
| *F02D 41/26* | (2006.01) |
| *F02P 5/04* | (2006.01) |
| *F02D 41/02* | (2006.01) |
| *F02D 37/02* | (2006.01) |

(52) U.S. Cl.
CPC ............ *H02P 9/008* (2013.01); *B60R 16/033* (2013.01); *F02D 29/02* (2013.01); *F02D 37/02* (2013.01); *F02D 41/0225* (2013.01); *F02D 41/26* (2013.01); *F02P 5/045* (2013.01); *F02D 2200/101* (2013.01); *F02D 2200/1006* (2013.01); *F02D 2250/24* (2013.01)

(58) Field of Classification Search
CPC .......... F02C 41/30; F02C 43/00; F02C 28/00; F02D 41/30; F02D 43/00; F02D 28/00

USPC .......... 701/102, 103, 22; 123/339.16, 339.23
See application file for complete search history.

(56) References Cited

U.S. PATENT DOCUMENTS

| | | | | |
|---|---|---|---|---|
| 5,528,148 A * | 6/1996 | Rogers | ................ | B60L 11/1861 320/137 |
| 7,019,414 B2 * | 3/2006 | Albertson | ............. | B60W 10/06 290/40 B |
| 7,036,484 B2 * | 5/2006 | Mathews | ............... | F02D 31/003 123/339.11 |
| 7,245,038 B2 * | 7/2007 | Albertson | ............... | F02D 29/06 290/40 B |

(Continued)

OTHER PUBLICATIONS

Demarco, John Anthony et al., "Engine Speed Control Via Alternator Load Shedding," U.S. Appl. No. 14/614,881, filed Feb. 5, 2015, 50 pages.

(Continued)

*Primary Examiner* — Thomas G Black
*Assistant Examiner* — Wae L Louie
(74) *Attorney, Agent, or Firm* — Julia Voutyras; McCoy Russell LLP

(57) ABSTRACT

Method and systems are provided for, in response to a state of charge (SOC) of a vehicle battery increasing above a threshold SOC, reducing an alternator charging based on one or more of a spark timing, an engine speed, an air-fuel ratio, and an engine load. In this way, fuel consumption may be reduced while maintaining a battery SOC for operation of front-end accessories may be achieved, and fuel consumption may be reduced during aggressive vehicle driving conditions such has high engine loads near transmission downshift thresholds and high engine speeds.

20 Claims, 8 Drawing Sheets

(56) References Cited

U.S. PATENT DOCUMENTS

| | | | | |
|---|---|---|---|---|
| 2011/0144881 A1* | 6/2011 | Glugla | ............... | F02P 15/08 |
| | | | | 701/102 |
| 2012/0095667 A1* | 4/2012 | Hase | ............... | F02D 41/3082 |
| | | | | 701/103 |
| 2015/0112525 A1* | 4/2015 | Johri | ............... | B60W 10/06 |
| | | | | 701/22 |
| 2015/0336566 A1* | 11/2015 | Johri | ............... | B60W 10/26 |
| | | | | 701/22 |
| 2015/0360690 A1* | 12/2015 | Nefcy | ............... | B60W 10/06 |
| | | | | 477/3 |
| 2016/0237927 A1* | 8/2016 | Long | ............... | F02D 41/0077 |
| 2016/0244043 A1* | 8/2016 | Nefcy | ............... | B60W 10/26 |
| 2016/0319758 A1* | 11/2016 | Pallett | ............... | H02P 9/008 |
| 2017/0317626 A1* | 11/2017 | Leone | ............... | F02D 29/02 |

OTHER PUBLICATIONS

Pallett, Tobias John, "Methods and Systems for Efficient Engine Torque Control," U.S. Appl. No. 14/702,540, filed May 1, 2015, 85 pages.

\* cited by examiner

ALTERNATOR CHARGING BASED ON MARGINAL FUEL COST

FIELD

The present application relates to methods and systems for charging an alternator while reducing fuel consumption.

BACKGROUND/SUMMARY

The alternator load imposed on an engine can be adjusted based on driver demanded engine torque in order to improve fuel economy. For example, alternator load may be decreased with increasing engine torque demands, and may be increased with decreasing engine torque demands. Furthermore, fuel economy can be improved by scheduling alternator charging preferentially during vehicle deceleration to capture energy via regenerative braking, and by turning off the alternator charging at wide-open throttle to improve vehicle acceleration.

However, the inventors herein have recognized various issues with the above approach. Namely, the above conventional alternator control strategies fail to recognize the fuel efficiency penalty (e.g. marginal fuel cost) for converting fuel to shaft work while charging the battery with the alternator during engine operating conditions where marginal fuel cost is higher such as spark retard, fuel enrichment, high engine speeds, and when the engine is operating near a transmission downshift threshold. Accordingly, during these engine operating conditions, following conventional alternator control strategies may unnecessarily cause increases in fuel consumption.

In one example, the issues described above may be at least partially addressed by a method comprising: in response to a state of charge (SOC) of a vehicle battery increasing above a threshold SOC, reducing an alternator charging based on one or more of a spark timing, an engine speed, an air-fuel ratio, and an engine load.

In another example, a method for an engine may comprise: adjusting an alternator torque in response to a state of charge (SOC) of a vehicle battery increasing above a threshold SOC, the adjusting based on one or more of a spark timing, an engine speed, an air-fuel ratio, and an engine load.

In another example, a vehicle system may comprise: an engine; an alternator mechanically coupled to the engine and electrically coupled to a battery; a controller on-board the engine, including executable instructions to, in response to a battery state of charge (SOC) being greater than a threshold SOC, adjusting an alternator torque based on one or more of a spark timing, an air-fuel ratio, an engine speed, and an engine load.

In this way, the technical result of reducing fuel consumption while maintaining a battery SOC for operation of front-end accessories may be achieved. Furthermore, fuel consumption and exhaust emissions may be reduced during aggressive vehicle driving conditions such has high engine loads near transmission downshift thresholds and high engine speeds. For example, avoidance of alternator charging at high loads will reduce engine load and spark retard, which may reduce the need for high load enrichment and thus reduce hydrocarbon and carbon monoxide emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
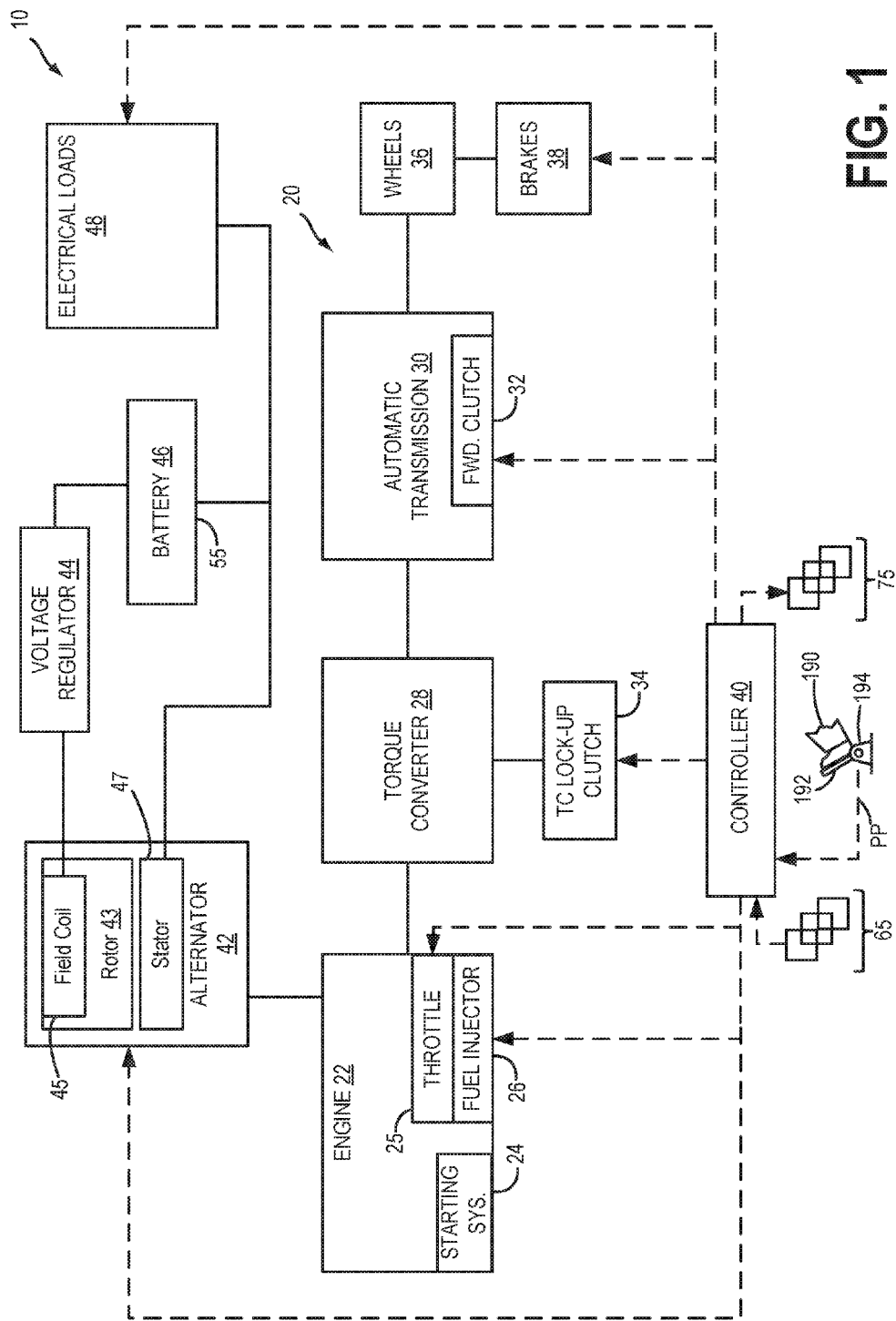
FIG. 1 shows an example vehicle system layout, including an alternator mechanically coupled to an engine.
Figure 8:
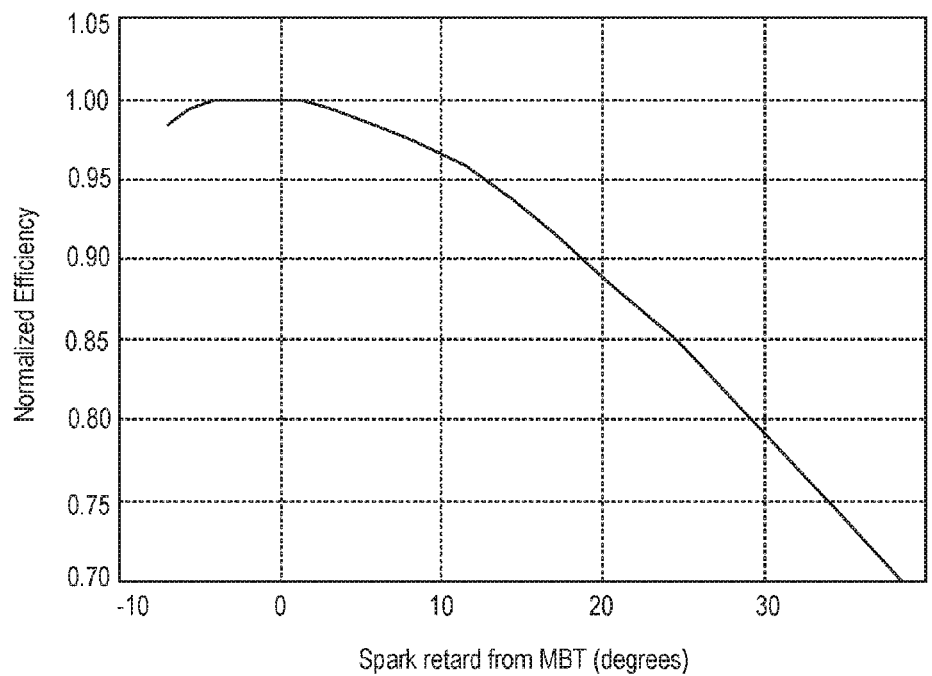
FIG. 8 shows an example plot of normalized engine efficiency versus spark retard from Maximum Brake Torque.
Figure 9:
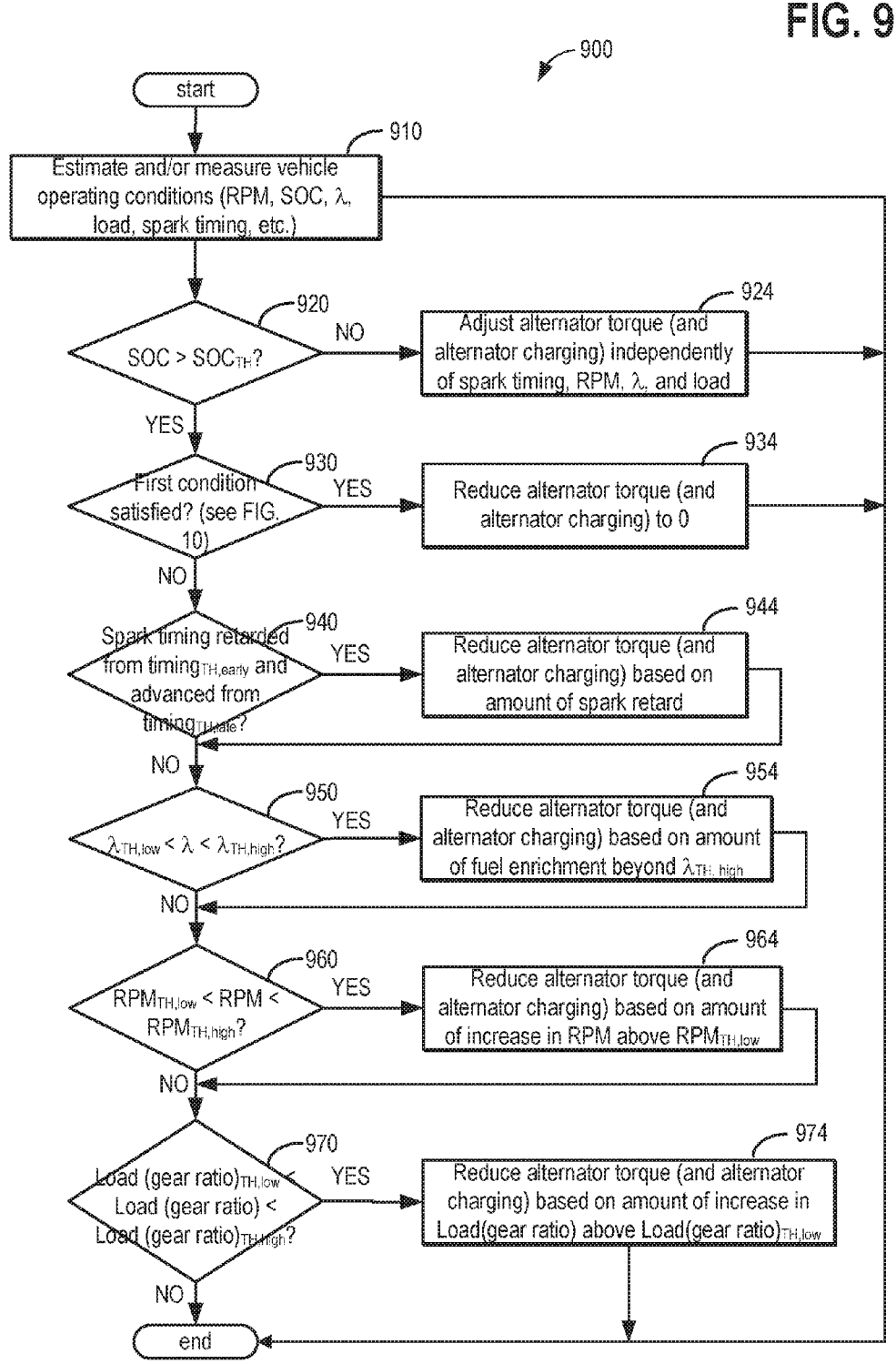
FIGS. 9-10 show high level flow charts of a method for operating an engine mechanically coupled to the alternator of the vehicle system of FIGS. 1-2.
Figure 10:
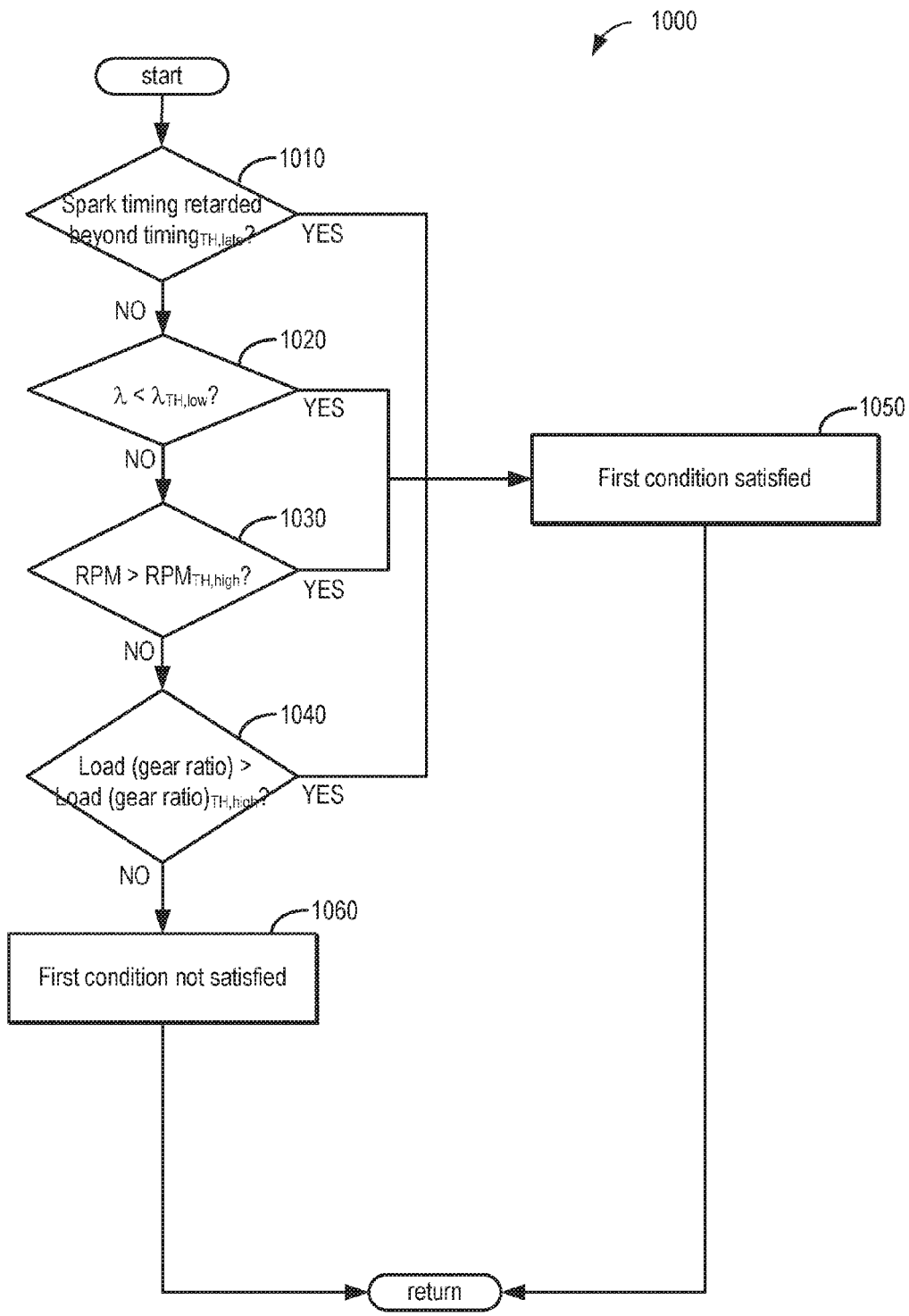

The following description relates to system and methods for aiding in the deceleration of a vehicle, and maintaining engine speed during engine idle to within a desired range of engine speeds. A vehicle system, as shown in FIG. 1, may be configured with an alternator that is mechanically coupled to an engine. In one example, a current and/or voltage may be applied to a field coil of the alternator which may generate an alternator output current that may then be used to power various electrical loads (e.g., ancillary electrical devices) and charge the battery. In other examples, the conversion of mechanical to electrical energy may vary from the conventional alternator field control method described above. Additionally, since the alternator is mechanically coupled to the engine, the current applied to the field coil of the alternator may be configured to adjust a load applied to the engine. For example, during engine operating conditions where the marginal fuel cost is increased, alternator charging may be adjusted in order to increase or maintain fuel economy while maintaining battery SOC and operation of front-end accessories, as illustrated by the methods of FIGS. 9 and 10. Engine operating conditions where the marginal fuel cost is increased may include engine operation higher engine speeds (as illustrated by FIGS. 3-6 and 9) and during periods of spark retard (as illustrated in FIG. 8). Vehicle system operation following the methods of FIGS. 9 and 10 to adjust alternator charging during higher marginal fuel cost engine operating conditions is illustrated by the example timeline of FIG. 11.

FIG. 1 shows a block diagram layout of a vehicle system 10, including a vehicle drive-train 20. Drive-train 20 may be powered by engine 22. In one example, engine 22 may be a gasoline engine. In alternate examples, other engine configurations may be employed, for example a diesel engine. Engine 22 may be started with an engine starting system 24, including a starter. In one example, the starter may include an electrical motor. The starter may be configured to support engine restart at or below a predetermined near zero threshold speed, for example at or below 50 rpm, or 100 rpm. Torque of engine 22 may be adjusted via torque actuators, such as a fuel injector 26, throttle 25, camshaft (not shown), etc. Specifically, torque of engine 22 may be controlled by adjusting an amount of intake air flowing to the engine via a position of a throttle valve (not shown), an amount of fuel injected to the engine by fuel injector 26, and a spark timing.

During engine operation, the controller 40 may regulate spark timing by coordinating fuel injection to the engine and a engine cylinder spark ignition system (not shown) comprising spark plugs and spark ignitors. Ignition spark timing may be controlled to occur in the engine combustion chambers (e.g., engine cylinders) near the end of the cylinder compression stroke (e.g., when the cylinder is in the top-dead-center, TDC, position). Advancing the spark timing before TDC (BTDC) may improve engine efficiency (engine output power per unit of fuel consumed) by accounting for the delay between spark firing and complete fuel combustion and the duration during which burning and combustion gas expansion occurs. In this way, advancing the spark timing BTDC aids in ensuring that the spark is energized prior to the point where the combustion chamber reaches its smallest size (end of the cylinder compression stroke), so that the combustion gas can provide the power to the engine for the cylinder expansion stroke. Spark ignition occurring after top dead center (ATDC) reduces engine efficiency since a portion of the combustion energy and combustion gas expansion may be wasted since the engine cylinder has already begun expanding. Spark timing may be advanced or retarded according to engine conditions. As engine speed increases, the engine pistons move at higher speeds, and the spark may be advanced in order to maintain fuel combustion at TDC. Spark timing may also influence engine performance related to vibrations and engine wear. For example, during wide-open throttle (e.g., at high engine loads), the spark timing may be controlled at maximum brake torque (MBT), which can correspond to BTDC, to increase engine power and efficiency. In other examples, the spark timing may be slightly retarded from MBT in order to reduce engine cylinder pressures and temperature, engine knocking, and engine wear, and to increase vehicle drivability and comfort and to increase fuel economy. Reducing engine cylinder temperatures may aid in reducing engine emissions, such as nitrogen oxides (NOx).

An engine output torque may be transmitted to torque converter 28 to drive an automatic transmission 30. In some examples, the torque converter may be referred to as a component of the transmission. The output of the torque converter 28 may be controlled by torque converter lock-up clutch 34. When torque converter lock-up clutch 34 is fully disengaged, torque converter 28 transmits torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter 28 clutch to an input shaft (not shown) of transmission 30. Alternatively, the torque converter lock-up clutch 34 may be partially engaged, thereby enabling the amount of torque relayed to the transmission to be adjusted.

Torque output from the automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels. For example, transmission torque may be transferred to vehicle wheels 36 by engaging one or more clutches, including forward clutch 32. As such, a plurality of such clutches may be engaged, as needed. Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

The automatic transmission 30 may comprise multiple gearing ratios so that engine power output for a given engine speed may be adjusted based on engine operating conditions. Upon starting the engine, or engine step-in, upon setting the vehicle in motion from a stationary state, and at low vehicle speeds, the engine may operate at lower gear ratios to provide enough power to set and maintain the vehicle in motion. As the vehicle speed increases, the automatic transmission 30 may upshift to a higher gear ratio to reduce engine speeds and engine wear, and to maintain engine efficiency. The automatic transmission 30 may also downshift in response to an engine load increasing above a threshold engine load in order to provide sufficient power output and reduce engine wear. The threshold engine load can depend on the current gear ratio of automatic transmission 30. Downshifting in response to increasing load above the threshold engine load at a particular gear ratio may reduce short term fuel economy.

Vehicle system components outside of the drivetrain may include an alternator 42, a battery 46, and auxiliary electrical loads 48. Auxiliary electrical loads 48 may include: lights, radio system, HVAC systems (for heating and/or cooling a vehicle cabin), seat heater, rear window heaters, cooling fans, etc. Alternator 42 may be configured to convert the mechanical energy generated while running engine 22 to electrical energy for powering the electrical loads 48 and charging the battery 46. Alternator 42 may include a rotor 43, mechanically coupled to the engine 22, and a stator 47 electrically coupled to the battery 46. In a preferred embodiment, the rotor 43 may include a rotor field coil 45, which when electrically energized, may induce current to flow in the stator 47, if the rotor 43 is spinning relative to the stator 47. In other embodiments, the field coil 45 may be included in stator 47, and not the rotor 43. Thus, the output current may be induced in the spinning rotor 43, instead of the stationary stator 47. Thus, in the preferred embodiment, when a voltage is applied to the field coil 45, and the engine 22 is running, a current may be generated in the stator 47. In one embodiment, current to the field coil 45 may be provided by the battery 46. In another embodiment, the alternator 42 may include its own DC generator (not shown) for supplying current to the field coil 45. The voltage and/or current to the field coil 45 may be controlled by a voltage regulator 44. The voltage regulator may be a DC/DC converter (or DC/DC converter based device) for example, configured to output a regulated voltage to the field coil 45. In one example the voltage regulator 44 may be included within the alternator 42. In another example, the voltage regulator 44 may be external to the alternator 42. Thus, the voltage and/or current to the field coil 45, and therefore the current output by the stator 47 may be regulated by the voltage regulator 44. In one example, a voltage command from a controller 40 may be compared to a voltage (e.g., state of charge, SOC) of a battery by the voltage regulator 44. If the voltage command of the controller 40 differs from the battery voltage, the average voltage and/or current to the field coil 45 may be adjusted to voltage commanded by the controller 40. As an example, if the voltage commanded from the controller is greater than the battery voltage, the voltage and/or current applied to the field coil 45 may be increased, to increase the current output by the stator 47. When current is generated in the stator 47, an electromotive force is exerted on the rotor 43 by the stator 47, which opposes the rotational motion of the rotor 43. As such, when a voltage is applied to the alternator field coil 45, a load is applied on the engine 22. In one example, decreasing the voltage and or current applied to the field coil 45 may decrease the current output by the alternator 42 and decrease the load applied to the engine 22. Thus, the load applied to the engine 22 may be adjusted by increasing or decreasing the voltage and/or current applied to the field coil 45 of the alternator 42.

A rotor (e.g., rotor 43) of an alternator (e.g., alternator 42) may be mechanically coupled to an engine (e.g., engine 22). As such, increasing the alternator torque may increase a load applied on the engine by the alternator, and provide a braking force to a vehicle system (e.g., vehicle system 10). As will be discussed in greater detail below with reference to FIGS. 9-11, the voltage and/or current applied to the field coil 45 of the alternator, and thus the alternator charging and the alternator torque (e.g., load) exerted on the engine, may be adjusted in response to various engine operating conditions to maintain or reduce fuel consumption while maintaining battery SOC for operating the auxiliary electrical loads 48. The controller may increase alternator torque and current supplied to a battery (e.g., battery 46).

In one example, the controller may increase the voltage supplied to an alternator field coil (e.g., alternator field coil 45), thereby increasing the strength of the magnetic field generated by the field coil and the alternator torque. In another example, the controller may increase the set point of a voltage regulator (e.g., voltage regulator 44). Increasing the set point of the voltage regulator may increase the desired current output from the alternator. The voltage regulator may in turn increase the voltage supplied to the alternator field coil to bring about a resulting increase in the current output by the alternator. Thus, the controller may send a signal to the voltage regulator to increase the voltage and/or current to the alternator field coil. As a result of the increase in alternator field coil voltage, the load applied to the engine may increase thereby slowing down the vehicle system, and the current output of the alternator may increase. The increased electrical power output from the alternator may be directed by the controller to charge the battery or may be used to directly power auxiliary electrical loads 48. Therefore, increasing alternator torque may not only be used to provide a braking force to the vehicle via an increase in alternator torque, but it may also be used to charge the battery or to directly power auxiliary electrical loads.

Vehicle system 10 may be controlled at least partially by a controller 40 and by input from a vehicle operator 190 via an input device 192. In this example, input device 192 includes an accelerator pedal and a brake pedal. Additionally, a pedal position sensor 194 is included in the input device 192 for generating a proportional pedal position signal PP. Controller 40 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 40 may be configured to receive information from a plurality of sensors 65 and to send control signals to a plurality of actuators 75 (various examples of which are described herein). Other actuators, such as a variety of additional valves and throttles, may be coupled to various locations in the vehicle system 10. Controller 40 may receive input data from the various sensors, process the input data, and trigger the actuators in response to the processed input data based on instruction or code programmed therein corresponding to one or more routines. Example control routines are described herein with regard to FIGS. 9-10.

Figure 11:
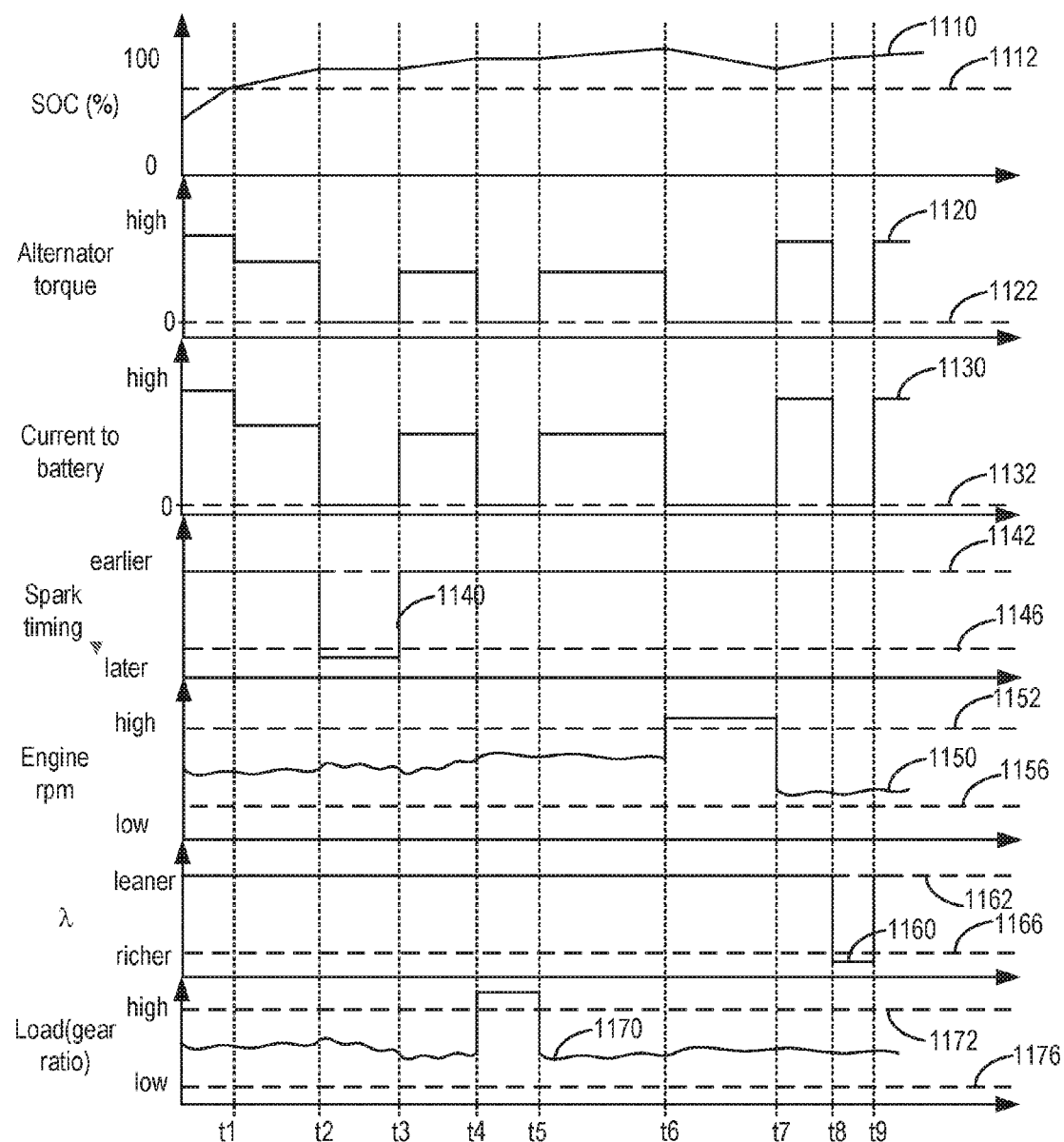
FIG. 11 shows an example timeline for operating an engine mechanically coupled to the alternator of the vehicle system of FIGS. 1-2

As elaborated in FIGS. 9-11, controller 40 may be configured to vary a voltage or current applied to the alternator field coil 45 to thereby adjust the mechanical load applied to the engine via the alternator 42 during various engine conditions. By varying the alternator field voltage or current, it is possible to change the load that the alternator applies to the engine so that alternator load can be varied according to control parameters that are not strictly dependent on engine speed. For example, alternator field voltage or current can be adjusted to compensate for engine friction that is related to engine temperature. Alternatively, the controller 40 can provide a predictable consistent amount of mechanical load on the engine by substantially maintaining a constant voltage to the alternator field coil circuit. However, it should be noted that field current and load provided by the alternator to the engine are not constant when a constant voltage is applied to the alternator field. Rather, when a constant voltage is applied to the alternator field coil the alternator field current changes with the angular velocity of the rotor. Thus, the current output by the stator 47, depends on both the voltage and/or current applied to the field coil 45 and the speed of the engine 22. The load applied to the engine 22 by the alternator 42 depends on the voltage and/or current applied to the field coil 45.

Controller 40 may be configured to receive inputs from engine 22 and accordingly adjust a mechanical load applied to the engine via the alternator by adjusting voltage or current supplied to the alternator field coil 45. As one example, the controller may adjust a voltage or current supplied to the alternator field coil based on a deviation an actual engine speed is above a engine speed lower threshold. Furthermore if the engine speed is greater than an engine speed upper threshold, the controller 40 may adjust the voltage or current supplied to the alternator to be zero. By adjusting the field coil 45 voltage or current an intensity of a magnetic field produced by the field coil 45 in the alternator rotor 43 can be adjusted so that it becomes more or less difficult to rotate the rotor 43 of the alternator 42. In this way, it is possible to adjust a load applied to an engine 22 via an alternator mechanically coupled to the engine during various engine operating conditions so that alternator charging is mitigated or avoided during engine operating regions of high marginal fuel cost.

Controller 40 may also adjust an engine torque output by adjusting a combination of spark timing (also referred to herein as ignition timing), fuel pulse width, fuel pulse timing, and/or air charge, by controlling throttle opening and/or valve timing, valve lift and boost for turbo- or super-charged engines. In the case of a diesel engine, controller 40 may control the engine torque output by controlling a combination of fuel pulse width, fuel pulse timing, and air charge. In all cases, engine control may be performed on a cylinder-by-cylinder basis to control the engine torque output. Controller 40 may also adjust an engine torque by adjusting an air-fuel ratio, $\lambda$, which may be the mass ratio of air to fuel present in the engine combustion chambers (cylinders). The air-fuel ratio may be a stoichiometric air-fuel ratio, $\lambda_{stoich}$, if the amount of air present in the engine cylinders is just enough to completely burn all of the fuel. When the air-fuel ratio is less than $\lambda_{stoich}$, the air-fuel ratio is considered rich (e.g., enriched), and when the air-fuel ratio is greater than $\lambda_{stoich}$, the air-fuel ratio is considered lean. Rich air-fuel ratios may be less fuel efficient but may be desirable during certain engine conditions because they can increase engine power output and may lower engine temperatures and reduce engine wear. Lean air-fuel ratios may increase fuel efficiency, but can raise engine temperatures, increase engine emissions of nitrogen oxides, and increase engine wear.

When idle-stop conditions are satisfied (e.g., when the vehicle is idling and engine operating parameters are within a desired range), controller 40 may selectively shut down the engine, for example, by controlling operation of drivetrain and/or accessory components. Similarly, when engine restart conditions are met, such as when the vehicle is already in an idle-stop and one or more engine operating parameters are outside the desired range, controller 40 may selectively restart the engine by powering the starter using a battery. Further, controller 40 may use engine torque actuators (e.g., throttle 25 and fuel injector 26) along with making adjustments to current supplied to an alternator field coil 45 to control engine speed during engine idling. By controlling engine torque actuators and the load applied to the engine 22 via the alternator 42 it may be possible to control the speed of the engine 22 to within a desired range during idle.

Figure 2:
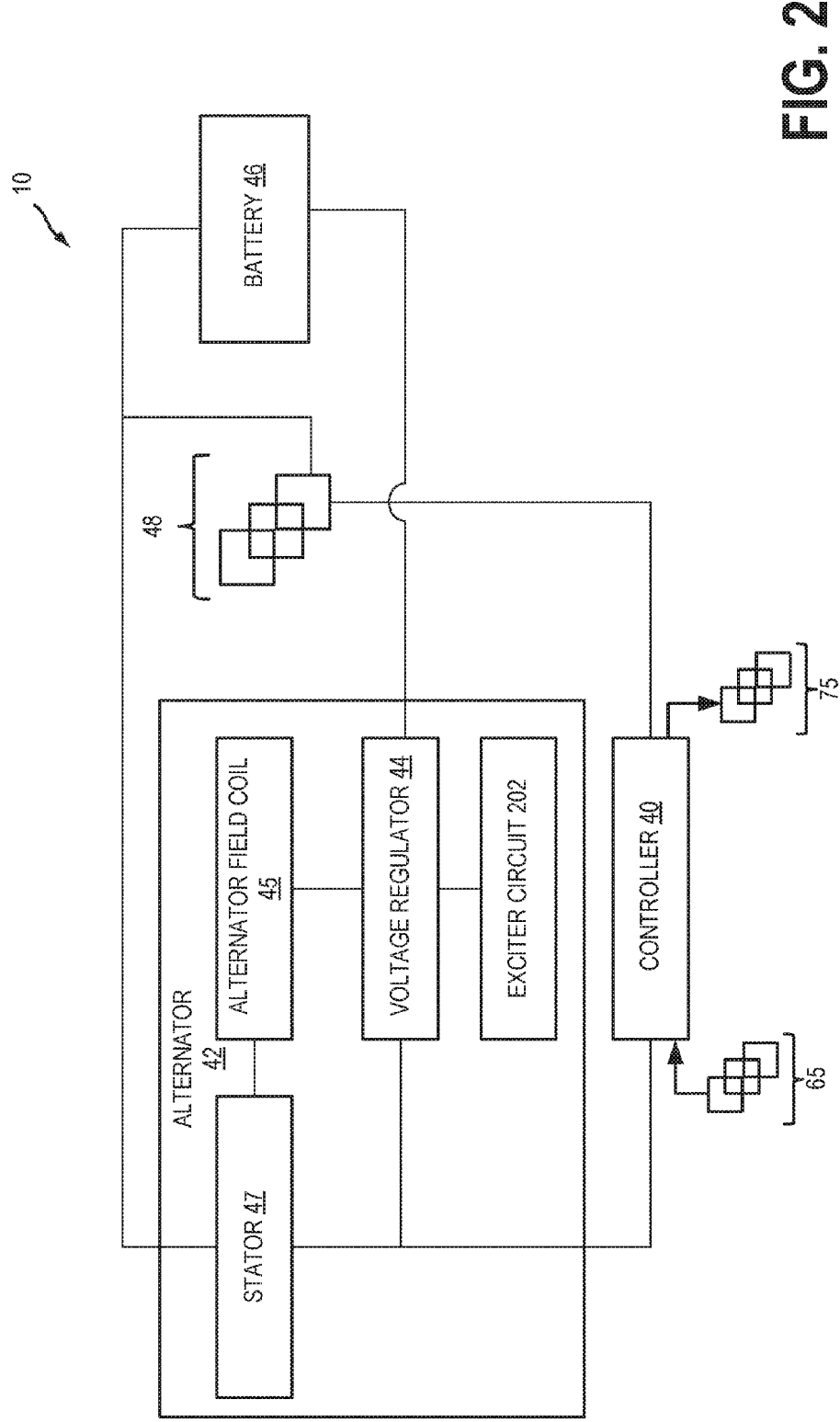
FIG. 2 shows an example electrical circuit for the vehicle system shown in FIG. 1.

Turning to FIG. 2, a block diagram layout of an example electrical system of vehicle system 10 from FIG. 1 is shown. Components of the vehicle system 10 shown in FIG. 2 may be the same as the components shown in FIG. 1. Thus, the components of the vehicle system 10 described above with reference to FIG. 1 may not be described in detail again below. All connecting lines shown in FIG. 2 represent electrical connections. As such, any components of vehicle system 10 shown coupled to one another may be directly electrically connected to one another.

Controller 40 may be configured to receive information from a plurality of sensors 65 and to send control signals to a plurality of actuators 75 (various examples of which are described herein). Other actuators, such as a variety of additional valves and throttles, may be coupled to various locations in the vehicle system 10. The controller 40 may be in electric communication with the stator 47, electrical loads 48 and voltage regulator 44. The electrical loads 48 may include ancillary electrical devices such as pumps, heaters, fans, radio, power steering, lights, and the like. In other examples, the controller 40 may be electrically coupled to the battery 46 and may be powered by the battery 46. In still further examples, the controller 40 may have its own power source. The voltage regulator 44 may be electrically coupled to the stator 47 of alternator 42, and the battery 46 for sensing voltages output by the stator 47 and battery 46, and relaying the sensed voltages to the controller 40. Controller 40 may send signals to the voltage regulator 44 to adjust the voltage and/or current to the alternator field coil 45. In one example, the alternator 42 may include its own exciter circuit 202 which may supply the voltage to the field coil 45. The exciter circuit 202 may be a DC generator or other DC current power source. In another example, the voltage for the field coil 45 may be supplied from the battery 46.

When an engine is running (e.g., engine 22), and voltage is applied to the alternator field coil 45, an alternating magnetic field may be produced by the field coil 45, which may induce current to flow in the stator 47. The stator 47 may comprise coil windings, configured to output current to power the electrical loads 48, and charge the battery 46. During engine operation, the voltage and/or current to the alternator field coil 45 may be modulated by commands from the controller 40 to the voltage regulator 44 depending on the current demands of the battery 46 and electrical loads 48. As an example, if the controller 40 determines that the current and/or voltage output by the alternator 42 exceeds the current and/or voltage draw from the battery 46 and electrical loads 48, then the controller may signal to the voltage regulator 44 to reduce the voltage and/or current to the field coil 45. In another example, if the controller 40 determines that the current output by the alternator 42 is less than the currents demands of the electrical loads 48, the controller may signal to the voltage regulator to increase the voltage and/or current to the field coil 45. Said another way, the voltage regulator 44, may vary a current applied to the field coil 45 to produce a constant voltage in the current output by the alternator 42. In some examples, the battery 46 may also be used to supplement electrical power output from the alternator 42, if the current demand from the electrical loads 48 is greater than the current output by the alternator 42. Said another way, the battery 46 may supply additional electrical power to the electrical loads 48 if the current demand from the electrical loads 48 exceeds the current output by the alternator 42. Thus, in some examples, the controller may sense battery current and control the current and/or voltage applied to the field coil 45 to achieve a constant state of charge on the battery 46.

During engine idle, a voltage sufficient to power all of the electrical loads 48 of the vehicle system 10 may continue to be applied to the field coil 45. In other examples, at engine idle, a voltage sufficient to power all of the electrical loads 48 and charge the battery 46 of the vehicle system 10 may be applied to the field coil 45. In still further examples, at engine idle, a voltage sufficient to charge the battery 46 but not all of the electrical loads 48 of the vehicle system 10 may be applied to the field coil 45. In other examples, the current applied to the field coil 45 may drop to approximately zero during engine idle, and the battery 46 may be used to supply all of the electrical power needs of the electrical loads. As will be discussed in greater detail below with reference to FIGS. 9-11, under certain engine operating conditions, the voltage and/or current to the alternator field coil 45 may be significantly reduced or interrupted completely (e.g., cut to 0V), such that a load applied to the engine (e.g., engine 22) by the alternator 42 may be reduced. Thus, controller 40 may receive signals relating to the charge state of the battery 46, power demands from the electrical loads 48, and current output from the stator 47 of alternator 42. Additionally, under certain operating conditions, the voltage and/or current to the alternator field coil 45 may be adjusted independently of engine operating conditions. For example, if the battery state of charge (SOC) is below a threshold SOC, the voltage and/or current to the alternator field coil 45 may be increased or maintained so that the battery SOC may be raised or maintained by the alternator and so that the battery can continue to provide power for the electrical loads 48. In one example, the threshold SOC charge may be 70% of the fully charged battery SOC. Furthermore, the controller 40 may estimate and/or measure engine operating conditions based on feedback from a plurality of sensors 65. In this way, controller 40 may adjust the voltage and/or current to the alternator field coil 45, and thereby the current output by the alternator 42, based on engine operating conditions, power demands from the electrical loads 48 and the charge state of battery 46.

Figure 3:
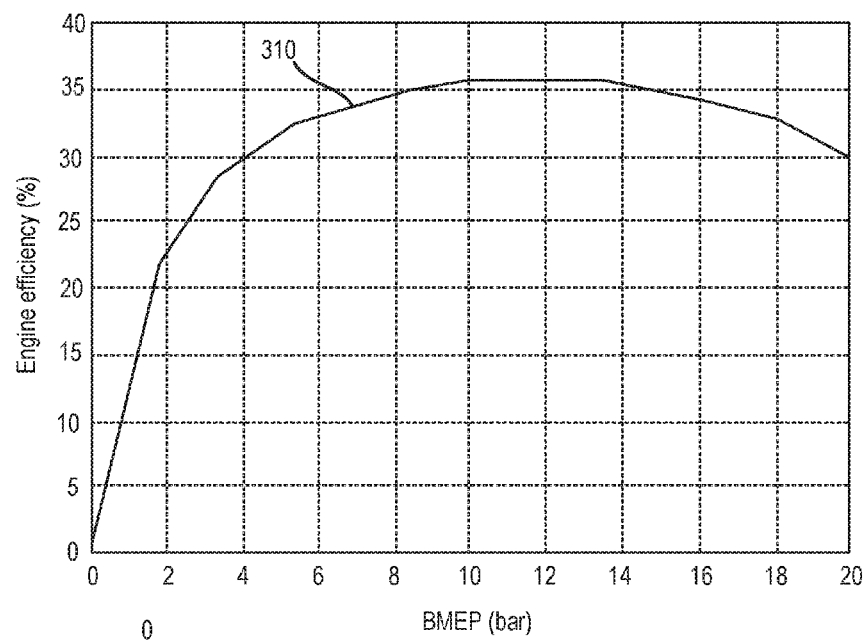
FIG. 3 shows an example plot of engine efficiency versus Brake Mean Effective Pressure.

Turning now to FIG. 3, it illustrates an example plot 300 of engine performance data as engine efficiency versus brake mean effective pressure (BMEP), over engine speeds from 1000 to 3000 rpm. Engine efficiency may comprise the percent of fuel energy used to produce useful work. Useful work may include engine power output to drive vehicle motion, power electrical loads, and the like, and may not include energy lost as wasted heat, friction, noise, vibration, and the like. Said another way, the engine efficiency may be understood as the amount of fuel consumed for a given amount of useful engine power output. BMEP may be an indication of engine load, and may be calculated from the brake torque average pressure which, if imposed on the engine cylinder pistons uniformly from top to bottom of each power stroke, would produce the measured (brake) power output. As indicated from plot 300, absolute engine efficiency is lower at low engine loads. Conventional alternator charging methods may avoid alternator charging at low loads because the absolute engine efficiency is low. The methods and systems described herein propose adjusting alternator charging based on marginal fuel cost (e.g., the additional fuel consumption rate resulting from changing engine operating conditions). When the marginal fuel cost is higher, the marginal fuel cost of charging the alternator is higher. Accordingly, reducing alternator charging or alternator torque during engine operating conditions when the marginal fuel cost is high can increase fuel economy.

Figure 4:
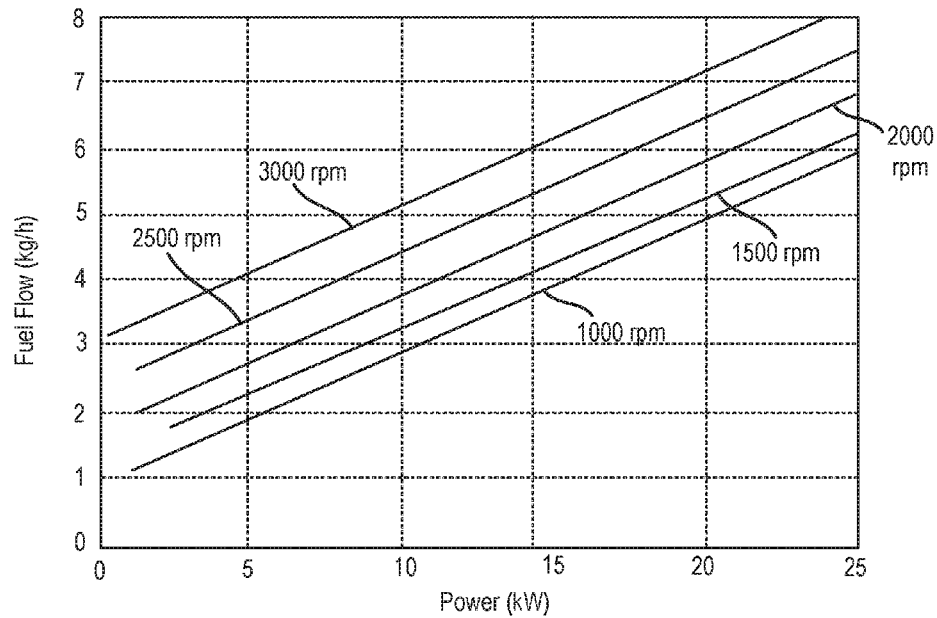
FIG. 4 shows an example plot of fuel flow versus engine power.

Turning now to FIG. 4, it illustrates an example plot 400 of the same engine performance data used in FIG. 3, plotted as fuel flow (to the engine) versus engine output power (in a region of engine output power of interest pertaining to fuel economy). Plot 400 illustrates that fuel flow (engine fuel consumption rate) is linear with engine power output over this range of data, for engine speeds of 1000 rpm, 1500 rpm, 2000 rpm, and 2500 rpm, indicating that incremental increases in power cause the same increase in fuel consumption, regardless of engine speed and engine torque (load). Said another way, the slope of fuel flow per engine power versus engine power is constant, as illustrated in plot 500 of FIG. 5, for engine speeds of 1000 rpm, 1500 rpm, 2000 rpm, and 2500 rpm. In other words the marginal fuel cost of producing an additional kW of engine power output remains constant at approximately 0.2 kg/h/kW over this range of engine operation, regardless of engine speed and engine torque.

Figure 5:
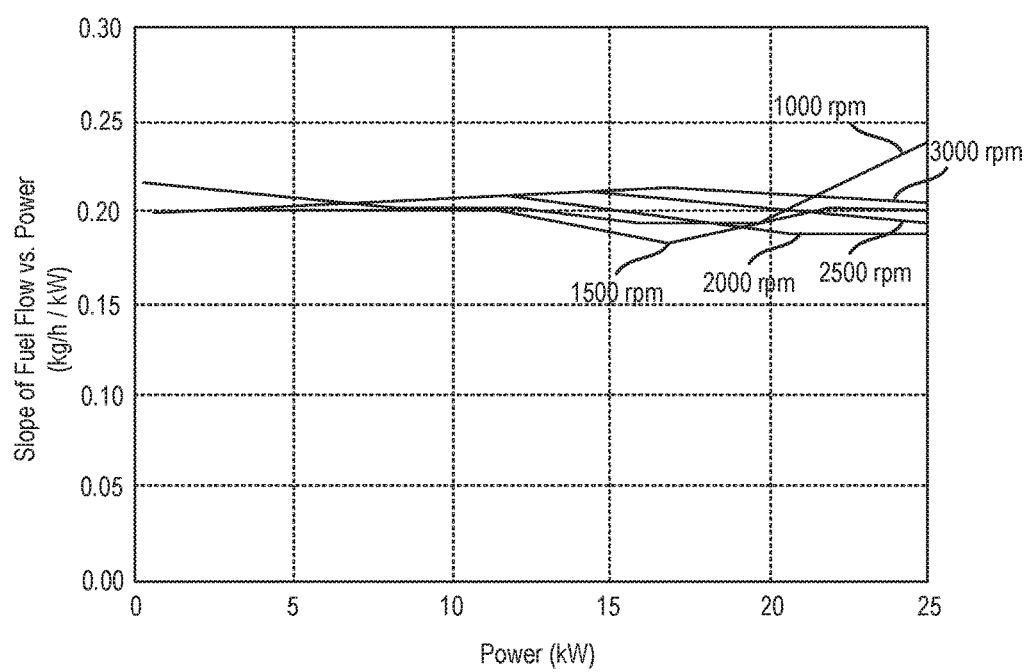
FIGS. 5-7 show example plots of the rate of change of fuel flow versus engine power, versus engine power.
Figure 6:
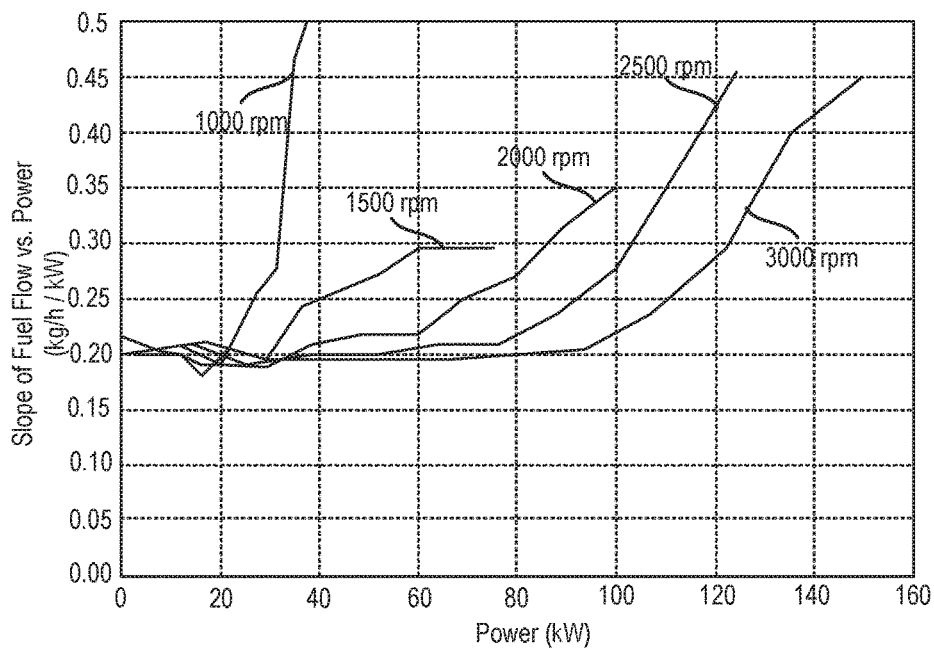
Figure 7:
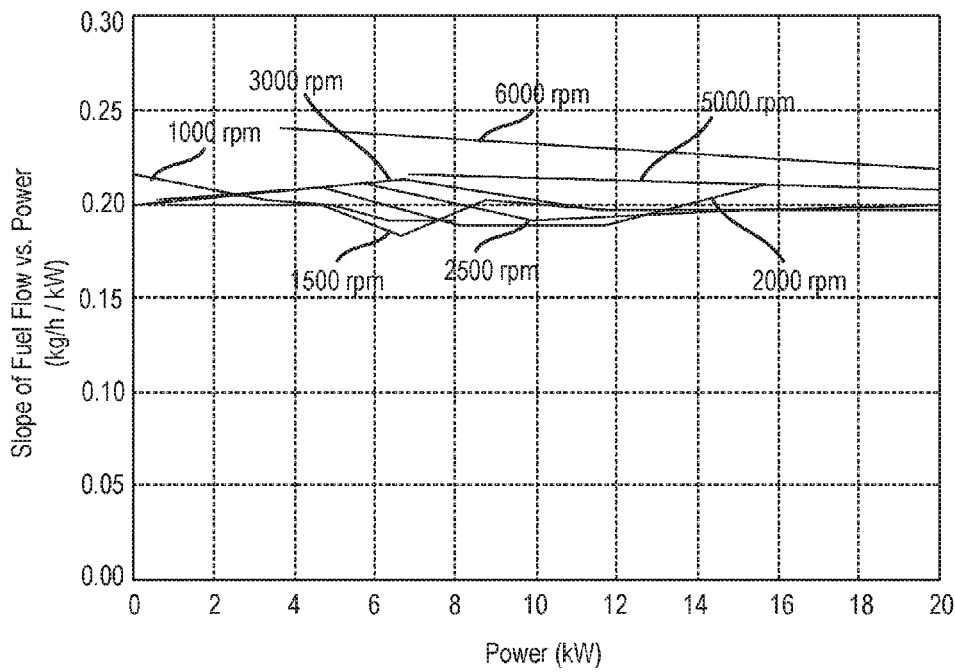

Turning now to FIG. 6, it illustrates a plot 600 of the same engine performance data used in FIGS. 3-5, plotted as the slope of fuel flow per engine power versus engine power, but extended to higher power regions, at 1000 rpm, 1500 rpm, 2000 rpm, 2500 rpm, and 3000 rpm. As evident from the steep increase in the curves near the upper power regions for each engine speed, the marginal fuel cost of increasing engine load is higher when may be already operating near the upper power output limit at a specific engine speed and/or gear ratio of the vehicle transmission. Consequently, fuel efficiency may be degraded when increasing engine load while an engine is operating at an upper power output limit for a given engine speed (e.g., at a given vehicle speed and gear ratio of the vehicle transmission). In this way, marginal fuel economy may be degraded when the engine load is increased above a threshold engine load at a current engine speed and/or transmission gear ratio. The threshold engine load may correspond to the upper power limit of the engine for the current engine speed and/or transmission gear ratio. Turning now to FIG. 7, it illustrates a plot 700 of the slope of fuel flow per engine power versus engine power, as in plot 500, but extended to higher engine speeds above 3000 rpm. Plot 700 shows that the marginal fuel cost of adding load to the engine (e.g., fuel flow per additional kW of engine power output) is also raised above 0.2 kg/h/kW at higher engine speeds. For example, at an engine speed of 5000 rpm, the marginal fuel cost is about 0.21-0.22 kg/h/kW and the marginal fuel cost at 6000 rpm is about 0.23-0.24 kg/h/kW depending on the engine load. Accordingly, when the engine speed is 5000 or 6000 rpm, increasing engine load can increase marginal fuel cost and reduce fuel economy.

Turning now to FIG. 8, it illustrates a plot 800 of normalized engine efficiency versus spark retard from MBT. As described above with reference to FIG. 1, retarding the spark timing from MBT can drastically reduce the engine efficiency because the fuel combustion and expansion of gases can occur after the engine cylinder compression stroke. For example, accordingly to plot 800, a spark retard of 20° from MBT can reduce the efficiency by more than 10 percent. Spark timing may be retarded from MBT at high engine loads to reduce engine knock, or at idling engine loads to control engine idling speed. A controller 40 can then directly determine a marginal fuel cost (e.g., normalized engine efficiency reduction) from the amount of spark retard.

As previously described, the methods and systems described herein relate to adjusting alternator charging (e.g., alternator torque) during engine operation in regions of high marginal fuel cost. As shown from FIGS. 3-8, high marginal fuel cost engine operating conditions can include when spark timing is retarded from a spark timing early threshold, when the engine speed is above an engine speed upper threshold, and when the engine load is close to an upper engine load threshold. Furthermore, marginal fuel cost may be increased when the air-fuel ratio is enriched below an air-fuel ratio threshold. Accordingly, the adjusting the alternating charging may be based on the amount of spark retard from the spark timing early threshold. In one example, the early spark timing threshold may comprise a spark timing at MBT, and adjusting the alternator charging may include reducing the alternator charging based on the amount of spark retard from the spark timing early threshold, MBT. For example, the alternator charging may be reduced in proportion to the amount of spark retard from the spark timing early threshold. Furthermore, the alternator charging may be reduced to zero if the spark timing is retarded beyond a spark timing late threshold, to avoid incurring higher marginal fuel costs and reducing fuel economy. For example, the spark timing late threshold may be 7° from MBT or 10° from MBT. Additionally, when the spark timing is between the spark timing early threshold and the spark timing late threshold, the alternator charging may increased based on an amount a spark timing is advanced from the spark timing late threshold.

Furthermore, adjusting the alternator charging may be based on the amount an engine speed is increased above an engine speed lower threshold. In one example, the engine speed lower threshold may comprise 3000 rpm, and adjusting the alternator charging may include reducing the alternator charging based on the increase in engine speed beyond the engine speed lower threshold of 3000 rpm. For example, the alternator charging may be reduced in proportion to the amount of increase in engine speed beyond the engine speed lower threshold. Furthermore, the alternator charging may be reduced to zero if the engine speed is increased above an engine speed upper threshold. For example, the engine speed upper threshold may be 5000 rpm so that when the engine speed is increased above 5000 rpm, the alternator charging is reduced to 0, to avoid incurring higher marginal fuel costs and reducing fuel economy. Additionally, when the engine speed is between the engine speed lower threshold and the engine speed upper threshold, the alternator charging may increased based on an amount an engine speed is reduced below the engine speed upper threshold.

Furthermore, adjusting the alternator charging may be based on the amount an engine load is increased above an engine load lower threshold, and the alternator charging may be reduced to zero above an engine load upper threshold. The engine load upper threshold may comprise 95% of the maximum load for a given engine speed, where the maximum load corresponds to a load above which the engine may downshift to a lower gear, thereby reducing fuel economy. The engine load lower threshold may correspond to a load above which the marginal fuel cost begins to increase at a higher rate for a given increase in engine load (e.g., power output). As shown in FIG. 6, the engine load lower and upper thresholds may be dependent on the engine speed, and therefore the transmission gear ratio. For example, at 3000 rpm (e.g., higher gear ratio), the engine load upper threshold may correspond to an engine output power of 130 kW and the engine load lower threshold may correspond to an engine output power of 90 kW. In contrast, at an engine speed of 1500 rpm (e.g., a lower gear ratio), the engine load upper threshold may correspond to an engine output power of 60 kW, and the engine load lower threshold may correspond to an engine output power of 30 kW. In one example, adjusting the alternator charging may include reducing the alternator charging based on the increase in engine load beyond the engine load lower threshold. For example, the alternator charging may be reduced in proportion to the amount the engine load is increased beyond the engine load lower threshold. Furthermore, the alternator charging may be reduced to zero if the engine load is increased above an engine load upper threshold, to avoid incurring higher marginal fuel costs and reducing fuel economy. Additionally, when the engine load at a particular engine speed is between the engine load lower threshold and the engine load upper threshold, the alternator charging may increased based on an amount an engine load is reduced below the engine load upper threshold.

Further still, adjusting the alternator charging may be based on the amount an engine air-fuel ratio is reduced (enriched) below an air-fuel ratio upper threshold. In one example, the engine air-fuel ratio upper threshold may comprise a stoichiometric air-fuel ratio, $\lambda_{stoich}$, and adjusting the alternator charging may include reducing the alternator charging based on the decrease in air-fuel ratio beyond the air-fuel ratio upper threshold, $\lambda_{stoich}$. For example, the alternator charging may be reduced in proportion to the amount the air-fuel ratio is enriched or reduced below the air-fuel ratio upper threshold. Furthermore, an amount of fuel enrichment may correspond to the deviation of air-fuel ratio below a stoichiometric air-fuel ratio. The engine air-fuel ratio upper threshold may also correspond to a lower threshold percent of enrichment, whereby the alternator charging is reduced based on the amount of fuel enrichment above the lower threshold percent of enrichment. The engine air-fuel ratio upper threshold may correspond to an air-fuel ratio at which the engine is operated under standard operating conditions. Furthermore, the alternator charging may be reduced to zero if the engine air-fuel ratio is decreased below an engine air-fuel ratio lower threshold. For example, the engine air-fuel ratio lower threshold may be 0.97 so that when the engine air-fuel ratio is reduced below 0.97, the alternator charging is reduced to 0, to avoid incurring higher marginal fuel costs and reducing fuel economy. The engine air-fuel ratio lower threshold may also correspond to an upper threshold percent of enrichment, whereby the alternator charging is reduced to 0 when the amount of fuel enrichment is increased above the upper threshold percent of enrichment. Additionally, when the engine air-fuel ratio is between the engine air-fuel ratio upper threshold and the engine air-fuel ratio lower threshold, the alternator charging may increased based on an amount an engine air-fuel ratio is increased above the engine air-fuel ratio lower threshold.

Accordingly, adjusting the alternator charging (including adjusting the alternator torque) may be responsive to operating the engine in regions where the marginal fuel cost is higher. For example, reducing the alternator charging can be responsive to enriching engine air-fuel ratio lower than the air-fuel ratio upper threshold, operating the engine above an engine speed lower threshold, operating the engine at loads greater than an engine load lower threshold (where the engine load lower threshold may be dependent on the engine speed and therefore on the transmission gear ratio), and when the spark timing is retarded beyond a spark-timing early threshold. Furthermore, the alternator charging (including adjusting the alternator torque) may be reduced to zero in response to enriching engine air-fuel ratio lower than the air-fuel ratio lower threshold, operating the engine above an engine speed upper threshold, operating the engine at loads greater than an engine load upper threshold (where the engine load upper threshold may be dependent on the engine speed and therefore on the transmission gear ratio), and when the spark timing is retarded beyond a spark-timing late threshold. Further still, increasing the alternator charging can be responsive to raising an engine air-fuel ratio above the air-fuel ratio lower threshold, reducing the engine below an engine speed upper threshold, reducing the engine load below an engine load upper threshold (where the engine load upper threshold may be dependent on the engine speed and therefore on the transmission gear ratio), and when the spark timing is advanced beyond a spark-timing late threshold.

In this manner, a vehicle system may comprise: an engine; an alternator mechanically coupled to the engine and electrically coupled to a battery; a controller on-board the engine, including executable instructions to, in response to a battery state of charge (SOC) being greater than a threshold SOC, adjusting an alternator torque based on one or more of a spark timing, an air-fuel ratio, an engine speed, and an engine load. Additionally or alternatively, adjusting the alternator torque based on the spark timing may comprise: increasing the alternator torque as a spark timing is advanced relative to a threshold spark retard, and reducing the alternator torque to zero when the spark timing is retarded beyond the threshold spark retard. Additionally or alternatively, adjusting the alternator torque based on the air-fuel ratio may comprise: increasing the alternator torque as the air-fuel ratio is increased above a threshold air-fuel ratio, and reducing the alternator torque to zero when the air-fuel is reduced below the threshold air-fuel ratio. Additionally or alternatively, adjusting the alternator torque based on the engine speed may comprise: increasing the alternator torque as the engine speed is decreased below a threshold engine speed, and reducing the alternator torque to zero when the engine speed is increased above the threshold engine speed. Additionally or alternatively, adjusting the alternator torque based on the engine load may comprise: increasing the alternator torque as the engine load is decreased below a threshold engine load, and reducing the alternator torque to zero when the engine load is raised above the threshold engine load, and wherein the threshold engine load varies with engine speed and/or with a transmission gear ratio.

Turning now to FIGS. 9-10, they illustrate flow charts for methods 900 and 1000 of adjusting alternator charging based on vehicle and engine operating conditions. Methods 900 and 1000 may be carried out via executable instructions on-board controller 40. Method 900 begins at 910 where controller 40 estimates and/or measures vehicle operating conditions such as engine rpm, battery SOC, air-fuel ratio, engine load, and spark timing. Method 900 continues at 920 where the controller 40 determines of the battery SOC is greater than a threshold SOC, $SOC_{TH}$. If $SOC<SOC_{TH}$, method 900 continues at 924 where the controller 40 may adjust the alternator torque (and the alternator charging) independently of spark timing, engine rpm, engine load, and air-fuel ratio. Because $SOC<SOC_{TH}$, the controller 40 may prioritize charging the battery over reducing marginal fuel cost and increasing fuel economy. After executing 924, method 900 ends. Returning to 920 for the case when $SOC>SOC_{TH}$, method 900 continues at 930 where the controller 40 determines if a first condition is satisfied (see FIG. 10). The first condition may correspond to engine operating conditions where the marginal fuel cost is high enough to warrant turning off the alternator charging (reducing the alternator torque to 0).

Turning now to FIG. 10, method 1000 beings at 1010 where controller 40 determines if the spark timing is retarded from a spark timing late threshold, $timing_{TH,late}$. As described above, $timing_{TH,late}$ may correspond to a spark timing of 7° later than MBT. If the spark timing is not retarded beyond $timing_{TH,late}$, method 1000 continues at 1020 where the controller 40 determines if an air-fuel ratio, λ, is reduced (e.g., enriched) below an air-fuel ratio lower threshold, $\lambda_{TH,low}$. As described above, $\lambda_{TH,low}$ may correspond to an air-fuel ratio of 0.97., $\lambda_{TH,low}$ may also correspond to a threshold percent of enrichment, wherein when the amount of fuel enrichment increases above $\lambda_{TH,low}$, the first condition may be satisfied (and the alternator torque may be reduced to zero). If the air-fuel ratio is not below $\lambda_{TH,low}$, method 1000 continues at 1030, where controller 40 determines if the engine speed, RPM, is greater than an engine speed upper threshold, $RPM_{TH,high}$. As described above, $RPM_{TH,high}$ may correspond to an engine speed of 5000 rpm. If RPM is not greater than $RPM_{TH,high}$, method 1000 continues to 1040 where controller 40 determines if the engine load at the current engine speed and transmission gear ratio, Load(gear ratio), is greater than an engine load upper threshold at the current engine speed and transmission gear ratio, Load(gear ratio)$_{TH,high}$. As described above, Load(gear ratio)$_{TH,high}$ may be dependent on the transmission gear ratio or engine speed; for example, Load(gear ratio)$_{TH,high}$ may be 60 kW at an engine speed 1500 rpm and may be 130 kW at an engine speed of 3000 rpm. If Load(gear ratio) is not greater than Load(gear ratio)$_{TH,high}$, method 1000 continues to 1060 where it determines that the first condition is not satisfied. After executing 1060, method 1000 returns to method 900 at 930. If the spark timing is retarded beyond $timing_{TH,late}$ at 1010, or if λ is reduced below $\lambda_{TH,low}$, or if RPM is increased above $RPM_{TH,high}$, or if Load(gear ratio) is increased above Load(gear ratio)$_{TH,high}$, method 1000 continues at 1050, where controller determines that the first condition is satisfied. After executing 1050, method 1000 ends, returning to method 900 at 930.

Returning to method 900 at 930, if the first condition is satisfied, controller 40 has determined that the engine is operating in a region of higher marginal fuel cost and method 900 continues at 934 where the controller 40 may reduce the alternator torque (and alternator charging) to 0. After executing 934, method 900 ends. If the first condition is not satisfied, method 900 continues at 940 where controller 40 determines if the spark timing is between a spark timing early threshold, $timing_{TH,early}$, and a spark timing late threshold, $timing_{TH,late}$. If the spark timing is retarded from $timing_{TH,early}$ and advanced from $timing_{TH,late}$, method 900 continues at 944 where controller 40 may reduce the alternator torque (and reduce the alternator charging) based on an amount the spark timing is retarded from $timing_{TH,early}$. Furthermore, controller 40 may reduce the alternator torque (and reduce the alternator charging) responsive to a spark timing being retarded from $timing_{TH,early}$. Similarly, controller 40 may increase the alternator torque (and increase the alternator charging) responsive to a spark timing being advanced from $timing_{TH,late}$.

After 944, and at 940 for the case where the spark timing is not retarded from $timing_{TH,early}$ and advanced from $timing_{TH,late}$, method 900 continues at 950 where controller 40 determines if the air-fuel ratio is between an air-fuel lower threshold, $\lambda_{TH,low}$, and an air-fuel upper threshold, $\lambda_{TH,high}$. If $\lambda_{TH,low}<\lambda<\lambda_{TH,high}$, method 900 continues at 954 where controller 40 may reduce the alternator torque (and reduce the alternator charging) based on an amount of fuel enrichment beyond $\lambda_{TH,high}$. For example, the alternator torque may be reduced based on an amount that λ deviates below $\lambda_{TH,high}$. Furthermore, controller 40 may reduce the alternator torque (and reduce the alternator charging) responsive to λ being reduced below $\lambda_{TH,high}$. Similarly, controller 40 may increase the alternator torque (and increase the alternator charging) responsive to a λ being increased above $\lambda_{TH,low}$.

After 954, and at 950 for the case where the air-fuel ratio is not between $\lambda_{TH,low}$ and $\lambda_{TH,high}$ not, method 900 continues at 960 where controller 40 determines if the engine speed, RPM, is between an engine speed lower threshold, $RPM_{TH,low}$, and an engine speed upper threshold, $RPM_{TH,high}$. If $RPM_{TH,low}<RPM<RPM_{TH,high}$, method 900 continues at 964 where controller 40 may reduce the alternator torque (and reduce the alternator charging) based on an amount RPM is raised above $RPM_{TH,low}$. For example, the alternator torque may be reduced based on an amount that RPM deviates above $RPM_{TH,low}$. Furthermore, controller 40 may reduce the alternator torque (and reduce the alternator charging) responsive to RPM being increased above $RPM_{TH,low}$. Similarly, controller 40 may increase the alternator torque (and increase the alternator charging) responsive to a RPM being reduced below above $RPM_{TH,high}$.

After 964, and at 960 for the case where the RPM is not between $RPM_{TH,low}$ and $RPM_{TH,high}$ not, method 900 continues at 970 where controller 40 determines if the engine load at the current engine speed and transmission gear ratio, Load(gear ratio), is between an engine load lower threshold, Load(gear ratio)$_{TH,low}$, and an engine load upper threshold, Load(gear ratio)$_{TH,high}$. Load(gear ratio)$_{TH,high}$ and Load(gear ratio)$_{TH,low}$ may depend on the current engine speed and/or the current transmission gear ratio. If Load(gear ratio)$_{TH,low}<$Load(gear ratio)$<$Load(gear ratio)$_{TH,high}$, method 900 continues at 974 where controller 40 may reduce the alternator torque (and reduce the alternator charging) based on an amount Load(gear ratio) is raised above Load(gear ratio)$_{TH,low}$. For example, the alternator torque may be reduced based on an amount that Load(gear ratio) deviates above Load(gear ratio)$_{TH,low}$. Furthermore, controller 40 may reduce the alternator torque (and reduce the alternator charging) responsive to Load(gear ratio) being increased above Load(gear ratio)$_{TH,low}$. Similarly, controller 40 may increase the alternator torque (and increase the alternator charging) responsive to a RPM being reduced below above Load(gear ratio)$_{TH,high}$. After 974, and at 970 for the case where the Load(gear ratio) is not between Load(gear ratio)$_{TH,low}$, and Load(gear ratio)$_{TH,high}$ not, method 900 ends.

In this manner, a method for an engine may comprise: in response to a state of charge (SOC) of a vehicle battery increasing above a threshold SOC, reducing an alternator charging based on one or more of a spark timing, an engine speed, an air-fuel ratio, and an engine load. Additionally or alternatively, the method may comprise, in response to the SOC decreasing below the threshold SOC, increasing the alternator charging independent of the spark timing, the engine speed, the air-fuel ratio, and the engine load. Additionally or alternatively, the method may comprise, reducing the alternator charging based on the spark timing comprises reducing the alternator charging in proportion to an amount of spark retard. Additionally or alternatively, the method may comprise, reducing the alternator charging based on the engine speed comprises reducing the alternator charging in proportion to an engine speed deviation above a threshold engine speed. Additionally or alternatively, the method may comprise, reducing the alternator charging based on the air-fuel ratio comprises reducing the alternator charging in proportion to an air-fuel ratio deviation below a stoichiometric air-fuel ratio. Additionally or alternatively, the method may comprise, reducing the alternator charging based on the engine load comprises reducing the alternator charging in proportion to an engine load deviation above a threshold engine load at the current engine speed.

In this manner, a method for an engine may comprise: adjusting an alternator torque in response to a state of charge (SOC) of a vehicle battery increasing above a threshold SOC, the adjusting based on one or more of a spark timing, an engine speed, an air-fuel ratio, and an engine load. Additionally or alternatively, adjusting the alternator torque based on the spark timing may comprise reducing the alternator torque based on an amount of spark retard. Additionally or alternatively, adjusting the alternator torque based on the spark timing may further comprise reducing the alternator torque to zero in response to the spark retarding beyond a threshold spark timing. Additionally or alternatively, adjusting the alternator torque based on the air-fuel ratio may comprise reducing the alternator torque based on an amount of fuel enrichment. Additionally or alternatively, adjusting the alternator torque based on the air-fuel ratio may further comprise reducing the alternator torque to zero in response to the amount of fuel enrichment increasing above a threshold percent of enrichment. Additionally or alternatively, adjusting the alternator torque based on the engine speed may comprise reducing the alternator torque based on an amount of increase in the engine speed. Additionally or alternatively, adjusting the alternator torque based on the engine speed may further comprise reducing the alternator torque to zero in response to the engine speed increasing above a threshold engine speed. Additionally or alternatively, adjusting the alternator torque based on the engine load may comprise reducing the alternator torque based on an amount of increase in the engine load. Additionally or alternatively, adjusting the alternator torque based on the engine load may further comprise reducing the alternator torque to zero in response to the engine load increasing above a threshold engine load at a current engine speed.

Turning now to FIG. 11, it illustrates a timeline 1100 for operating the vehicle system of FIGS. 1-2 according to the methods 900 and 1000. Timeline 1100 includes trend lines for battery SOC 1110, alternator torque 1120, current supplied to the battery from the alternator 1130, spark timing 1140, engine rpm, RPM 1150, air-fuel ratio 1160, and engine load, Load(gear ratio) 1170. Also shown in timeline 1100 are a threshold SOC 1112, zero alternator torque 1122, zero current to the battery 1132, a spark timing early threshold, timing$_{TH,early}$ 1142, a spark timing late threshold, timing$_{TH,late}$ 1146, an engine speed upper threshold, RPM$_{TH,high}$ 1152, an engine speed lower threshold, RPM$_{TH,low}$ 1156, an air-fuel ratio upper threshold, $\lambda_{TH,high}$ 1162, an air-fuel ratio lower threshold, $\lambda_{TH,low}$ 1166, an engine load upper threshold, Load(gear ratio)$_{TH,high}$ 1172, and an engine load lower threshold, Load(gear ratio)$_{TH,low}$ 1176.

Prior to time t1, The spark timing is at timing$_{TH,early}$, RPM$_{TH,low}$<RPM<RPM$_{TH,high}$, $\lambda_{TH,low}$<$\lambda$<$\lambda_{TH,high}$, Load (gear ratio)$_{TH,low}$<Load(gear ratio)<Load(gear ratio)$_{TH,high}$, and the battery SOC 1110 is less than the threshold SOC, SOC$_{TH}$. In response to SOC<SOC$_{TH}$, the controller 40 may adjust the alternator torque (and the alternator charging) to a high level independently from the spark timing, engine rpm, air-fuel ratio, and engine load because charging the battery has priority over reducing fuel economy. Consequently, the current supplied to the battery 1130 from the alternator is at a higher level, thereby providing a high level of alternator charging.

At time t1, in response to SOC increasing above SOC$_{TH}$, the controller 40 adjusts the alternator torque (and the alternator charging) to increase fuel economy. In particular, the controller 40 may reduce the alternator torque 1120 based on the amount that RPM is above RPM$_{TH,low}$, and based on the amount that Load(gear ratio) is above Load (gear ratio)$_{TH,low}$. Since the spark timing is at timing$_{TH,early}$ and $\lambda$ is at $\lambda_{TH,high}$, the controller 40 may not adjust the alternator torque based on the spark timing or $\lambda$. In response to the reduction in alternator torque 1120, the current supplied to the battery 1130 also is reduced concomitantly, since the alternator charging of the battery is reduced. Because the alternator torque is reduced at time t1, the rate of battery charging may slow as indicated by the shallower slope of the SOC trend line 1110.

At time t2, the spark timing is retarded beyond timing$_{TH,late}$, and in response, the alternator torque is reduced to 0 by the controller 40, in order to mitigate alternator charging while operating the engine in a high marginal fuel cost region. Because the alternator torque is reduced to 0 at time t2, battery charging ceases, as reflected by the current flowing to the battery 1130 reducing to 0 at time t2. Because alternator charging of the battery has stopped, the SOC remains constant between times t2 and t3 (assuming negligible electrical loads). Next, at time t3, the spark timing is advanced to timing$_{TH,early}$, and in response the alternator torque is increased by the controller 40 by an amount based on the deviation of the spark timing from timing$_{TH,late}$. From time t3 to time t4, the controller 40 may raise the alternator torque to a slightly lower torque as compared to the alternator torque between time t1 and time t2 because the RPM has increased to a higher value (while spark timing, air-fuel ratio, and Load(gear ratio) are equivalent) at time t3 as compared to between time t1 and time t2. As such, the controller 40 may actuate a larger alternator torque reduction (relative to the alternator torque prior to t1) at time t3 since the marginal fuel cost at time t3 is higher than the marginal fuel cost between time t1 and time t2. In response to the torque adjustment, the current supplied to the battery from the alternator also decreases between times t3 and t4 relative to between times t1 and t2, and is reflected by the slower rate of increase in SOC 1110 between times t3 and t4 relative to between times t1 and t2.

At time t4, controller 40 reduces the alternator torque 1120 to zero in response to Load(gear ratio) increasing above Load(gear ratio)$_{TH,high}$. Because the alternator torque is reduced to 0 at time t4, battery charging ceases, as reflected by the current flowing to the battery 1130 reducing to 0 at time t4. Because alternator charging of the battery has stopped, the SOC remains constant between times t4 and t5 (assuming negligible electrical loads). Next, at time t5, Load(gear ratio) is reduced below Load(gear ratio)$_{TH,high}$, and in response the controller 40 may increase the alternator torque from 0 by an amount based on the deviation of Load(gear ratio) below Load(gear ratio)$_{TH,high}$. From time t5 to time t6, the controller 40 may raise the alternator torque to approximately the same alternator torque between time t3 and time t4 since the spark timing, RPM, air-fuel ratio, and Load(gear ratio) are approximately the same between times t3 and t4 and between times t5 and t6. In response to the torque adjustment, the current supplied to the battery from the alternator also decreases between times t5 and t6 to approximately the same level as the current to the battery between times t3 and t4, and is reflected by the rate of increase in SOC 1110 between times t5 and t6 being similar to that between times t3 and t4.

At time t6, RPM increases above RPM$_{TH,\ high}$, and in response, controller 40 reduces the alternator torque to 0 to avoid charging of the alternator during engine operation with high marginal fuel cost. Because the alternator torque is reduced to 0, battery charging from the alternator ceases, and the battery SOC decreases from time t6 to time t7 as the battery supplies current for operation of various auxiliary electrical loads (e.g., heating, A/C, lighting, and the like). At time t7, RPM is reduced below RPM$_{TH,high}$ to a low RPM just above RPM$_{TH,low}$. In response, the controller 40 may increase the alternator torque from 0 based on the amount that RPM is below RPM$_{TH,high}$. At time t7, the alternator torque is raised to a higher torque by controller 40 as compared to the alternator torque at time t5 to time t6 because the spark timing, Load(gear ratio), and air-fuel ratio at time t7 are approximately equivalent to the spark timing, Load(gear ratio), and air-fuel ratio at time t5 to time t6, but the RPM is much lower. In response to the increase in alternator torque, the current to the battery from the alternator also rises, thereby charging the battery and increasing the SOC.

Next, at time t8, the air-fuel ratio is enriched such that λ drops below $λ_{TH,low}$. In response to λ decreasing below $λ_{TH,low}$, controller 40 reduces the alternator torque to 0, thereby reducing the current supplied to the battery from the alternator to 0. Because the battery ceases to charge, the SOC between times t8 and t9 remains constant (assuming negligible electrical loads drawn from the battery). At time t9, the air-fuel ratio increases above $λ_{TH,low}$ and in response, the alternator torque is increased by the controller 40 based on the amount that the air-fuel ratio is increased above $λ_{TH,low}$. After time t9, the alternator torque is returned to approximately the same alternator torque as between time t7 and time t8 since the air-fuel ratio, RPM, Load (gear ratio), and spark timing are approximately equivalent during those times. After time t9, SOC begins to gradually rise again due to the resumption of current being supplied to the battery from the alternator (e.g., alternator charging).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   in response to a state of charge (SOC) of a vehicle battery increasing above a threshold SOC, continuing to charge the battery with an alternator driven by an engine and then reducing the alternator charging in response to an increase in spark retard, and during the increase in spark retard.

2. The method of claim 1, further comprising adjusting alternator loading on the engine in response to each of an engine speed, an air-fuel ratio, and an engine load.

3. The method of claim 2, further comprising,
   in response to the SOC decreasing below the threshold SOC, increasing the alternator charging independent of each of the engine speed, the air-fuel ratio, and the engine load, wherein responsive to the SOC above the threshold SOC, reducing alternator loading is responsive to and dependent upon each of the engine speed, the air-fuel ratio, and the engine load.

4. The method of claim 2, further comprising reducing the alternator charging in proportion to an amount of spark retard.

5. The method of claim 2, wherein reducing the alternator charging based on the engine speed comprises reducing the alternator charging in proportion to an engine speed deviation above a threshold engine speed.

6. The method of claim 2, wherein reducing the alternator charging based on the air-fuel ratio comprises reducing the alternator charging in proportion to an air-fuel ratio deviation below a stoichiometric air-fuel ratio.

7. The method of claim 2, wherein reducing the alternator charging based on the engine load comprises reducing the alternator charging in proportion to an engine load deviation above a threshold engine load at a current engine speed.

8. A method for an engine, comprising:
adjusting an alternator torque in response to a state of charge (SOC) of a vehicle battery increasing above a threshold SOC, continuing to charge the battery with alternator torque thereafter and then, with the SOC still above the threshold SOC, reducing the alternator charging in response to an increase in spark retard, where the alternator charging is reduced proportionate to the increase in spark retard, during the increase in spark retard the adjusting of alternator torque is further based on an engine speed, an air-fuel ratio, and an engine load.

9. The method of claim 8, further comprising reducing the alternator torque to zero in response to the spark retarding beyond a threshold spark timing.

10. The method of claim 8, wherein adjusting the alternator torque based on the air-fuel ratio comprises reducing the alternator torque based on an amount of fuel enrichment.

11. The method of claim 10, wherein adjusting the alternator torque based on the air-fuel ratio further comprises reducing the alternator torque to zero in response to the amount of fuel enrichment increasing above a threshold percent of enrichment.

12. The method of claim 8, wherein adjusting the alternator torque based on the engine speed comprises reducing the alternator torque based on an amount of increase in the engine speed.

13. The method of claim 12, wherein adjusting the alternator torque based on the engine speed further comprises reducing the alternator torque to zero in response to the engine speed increasing above a threshold engine speed.

14. The method of claim 8, wherein adjusting the alternator torque based on the engine load comprises reducing the alternator torque based on an amount of increase in the engine load.

15. The method of claim 14, wherein adjusting the alternator torque based on the engine load further comprises reducing the alternator torque to zero in response to the engine load increasing above a threshold engine load at a current engine speed.

16. A vehicle system, comprising:
an engine;
an alternator mechanically coupled to the engine and electrically coupled to a battery;
a controller on-board the engine, including executable instructions to,
in response to a battery state of charge (SOC) being greater than a threshold SOC, continuing to charge the battery with the alternator and then reducing the alternator charging in response to an increase in spark retard, and during the increase in spark retard; and
further adjusting an alternator torque based on one or more of an air-fuel ratio, an engine speed, and an engine load, wherein the threshold SOC is below a fully charged battery SOC.

17. The vehicle system of claim 16, further comprising:
increasing the alternator torque as a spark timing is advanced relative to a threshold spark retard, and
reducing the alternator torque to zero when the spark timing is retarded beyond the threshold spark retard.

18. The vehicle system of claim 16, wherein adjusting the alternator torque based on the air-fuel ratio comprises:
increasing the alternator torque as the air-fuel ratio is increased above a threshold air-fuel ratio, and
reducing the alternator torque to zero when the air-fuel is reduced below the threshold air-fuel ratio.

19. The vehicle system of claim 16, wherein adjusting the alternator torque based on the engine speed comprises:
increasing the alternator torque as the engine speed is decreased below a threshold engine speed, and
reducing the alternator torque to zero when the engine speed is increased above the threshold engine speed.

20. The vehicle system of claim 16, wherein adjusting the alternator torque based on the engine load comprises:
increasing the alternator torque as the engine load is decreased below a threshold engine load, and
reducing the alternator torque to zero when the engine load is raised above the threshold engine load,
wherein the threshold engine load varies with the engine speed.

* * * * *